(12) United States Patent
Brundage

(10) Patent No.: US 6,993,988 B2
(45) Date of Patent: Feb. 7, 2006

(54) LOCKING CLIPS FOR RETAINING PARALLEL ELONGATED MEMBERS

(75) Inventor: Gary L. Brundage, Martinez, CA (US)

(73) Assignee: pHionics, Inc., Martinez, CA (US)

( * ) Notice: Subject to any disclaimer, the term of this patent is extended or adjusted under 35 U.S.C. 154(b) by 0 days.

(21) Appl. No.: 11/020,999

(22) Filed: Dec. 23, 2004

(65) Prior Publication Data

US 2005/0103134 A1    May 19, 2005

Related U.S. Application Data

(63) Continuation of application No. 10/194,373, filed on Jul. 12, 2002, now Pat. No. 6,834,560.

(51) Int. Cl.
    G01D 11/30    (2006.01)
    G01N 33/18    (2006.01)
(52) U.S. Cl. ............... 73/866.5; 73/53.01; 248/221.11
(58) Field of Classification Search ............... 73/866.5, 73/152.18, 53.01; 248/221.11, 230.7
    See application file for complete search history.

(56) References Cited

U.S. PATENT DOCUMENTS

| | | | |
|---|---|---|---|
| 3,113,363 A | 12/1963 | Fyvie | |
| 5,450,688 A | 9/1995 | Hall | |
| 5,610,346 A * | 3/1997 | Stelts | 73/866.5 |
| 5,678,348 A | 10/1997 | Zielinski et al. | |
| 5,747,710 A * | 5/1998 | Carmichael | 73/866.5 |
| 6,305,944 B1 | 10/2001 | Henry et al. | |
| 6,463,818 B1 * | 10/2002 | Stagg et al. | 73/866.5 |
| 2002/0100182 A1 | 8/2002 | Sakurai | |

OTHER PUBLICATIONS

U.S. Appl. No. 10/194,373, filed Jul. 12, 2002, Gary L. Brundage.

Global Water Intrumentation, Inc. product guide including information on: Temperature Sensor—WQ101; pH Sensor—WQ201; Conductivity Sensor—WQ301; Dissolved Oxygen Sensor—WQ401 and Orplredox—WQ600, 26 pages, Copright © Global Water Instrumentation, Inc. 2002, month not given but by Jul. and after Feb.

* cited by examiner

Primary Examiner—Thomas P. Noland
(74) Attorney, Agent, or Firm—Silicon Edge Law Group LLP; Arthur J. Behiel

(57) ABSTRACT

Described are clips for collecting sensors into multi-sensor arrays for insertion into wells and the like. The clips are adapted to easily receive the sensors and provide a lock for securing the sensors once installed. The clips can be adapted for use with elements other than sensors, in particular for applications in which a number of relatively elongated members are to be secured in parallel.

5 Claims, 4 Drawing Sheets

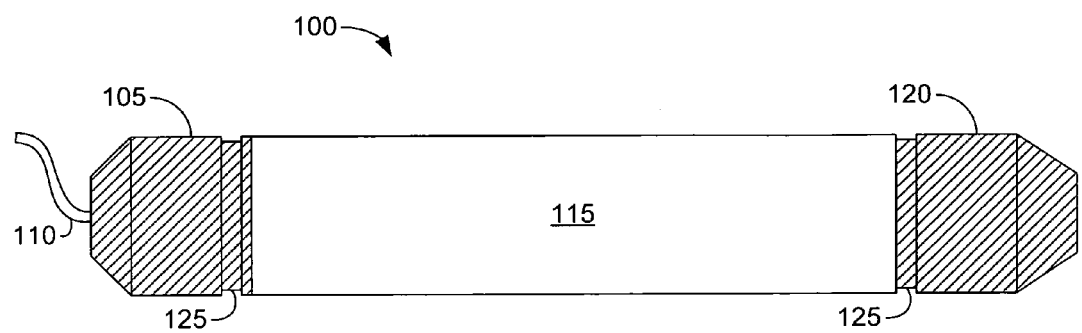
Fig. 1A
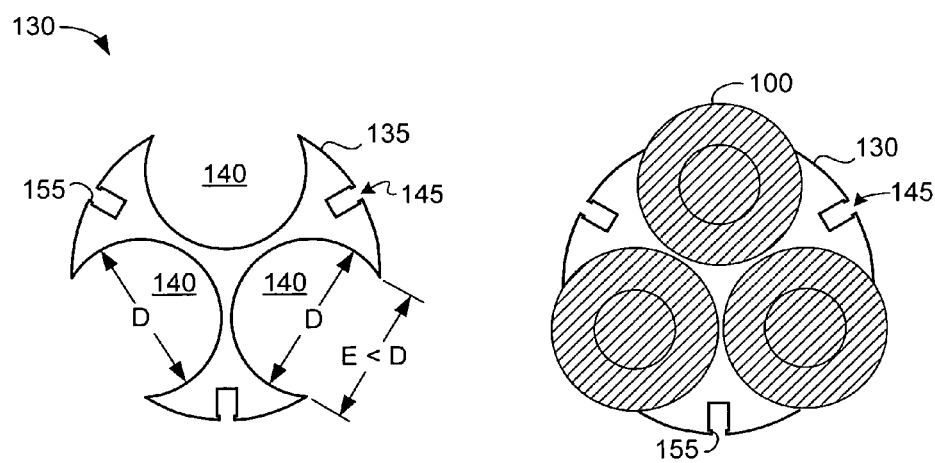
Fig. 1B
Fig. 1C

LOCKING CLIPS FOR RETAINING PARALLEL ELONGATED MEMBERS

BACKGROUND

Environmental consciousness and newly promulgated laws place ever-increasing emphasis on maintaining water quality in lakes, streams, groundwater, and industrial effluents. Due to this emphasis, there is a growing market for systems capable of monitoring various physical and chemical properties of water resources. Parameters of interest include conductivity, dissolved oxygen concentration, oxidation-reduction potential (ORP), pH, temperature, and depth, to name just a few.

Surface-water data is typically collected using immersed sensors. Collecting groundwater data can be more troublesome, often requiring that wells be drilled for sensor insertion. Drilling wells is expensive, but the cost can be reduced by minimizing bore diameter. Sensors for use in wells are therefore made to have relatively small diameters. For a detailed description of typical sensors, see U.S. Pat. No. 6,305,944 to Henry et al., which is incorporated herein by reference.

It is often desired to simultaneously monitor two or more water-resource parameters or to measure the same parameter with a number of redundant sensors. Such applications sometimes require a number of sensors be collectively inserted into a single well. Due to the desire to maintain a small well diameter, sensors are often staggered along a well bore for multi-sensor applications. Unfortunately, staggered sensors may be monitoring materially different water samples. Moreover, the water in some wells may be too shallow to submerge multiple sensors arranged in series. There is therefore a need for a means of introducing a plurality of sensors into narrow-bore wells.

BRIEF DESCRIPTION OF THE FIGURES

FIG. 1A depicts a sensor 100 that can be combined with like sensors to create multi-parameter systems for monitoring groundwater in small-diameter wells.

FIG. 1B depicts a clip 130 adapted to bind together three sensors 100 of the type depicted in FIG. 1A.

FIG. 1C depicts a multi-sensor array 160 that includes three sensors 100 arranged substantially in parallel.

DETAILED DESCRIPTION

Figure 2A:
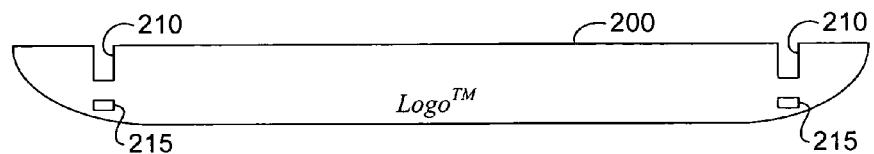
FIG. 2A depicts a lock 200 for insertion into respective compression reliefs 145 of a pair of clips 130.

FIG. 1A depicts a sensor 100 that can be combined with like sensors to create multi-parameter systems suited for monitoring groundwater in small-diameter wells. Sensor 100 is representative of a number of substantially cylindrical sensors used for e.g. sensing temperature, depth, pH, and ORP of groundwater. Sensor 100 conventionally includes a cable housing 105 that provides a secure, watertight connection between a cable 110 and a sensor body 115. The opposite end of sensor body 115 connects to a sensor housing 120. Sensor body 115 houses the electronics necessary to drive signals generated by a sensor in housing 120 out onto cable 110. Sensor 100 includes a pair of grooves 125, the widths of which are designed to accommodate a clip, described below, for securing sensor 100 to one or more other sensors. One or both of grooves 125 may be incorporated into body 115.

FIG. 1B depicts a clip 130 adapted to bind together three sensors 100 of the type depicted in FIG. 1A. Clip 130 includes three retaining elements 135 that define between them three retaining bays 140. Each retaining bay 140 has a diameter D that is somewhat greater than an opening E defined between adjacent pairs of retaining elements 135. Diameter D is selected to snugly accommodate grooves 125 of sensor 100.

In some embodiments, threads in sensor body 115 mate with opposite threads on sensor housing 120. The width of the groove 125 defined between housing 120 and body 115 can therefore be altered to accommodate clip 130. In one such embodiment, screw-tightening housing 120 into body 115 with clip 130 installed compresses clip 130 between housing 120 and body 115 to provide a secure mechanical connection, and screw-tightening housing 120 into body 115 without clip 130 installed eliminates the groove. Grooves 125 differ in FIG. 1A to show two examples, but are typically of the same type.

Compression reliefs 145 ease the compression of respective retaining elements 135 to admit sensors 105 into retaining bays 115. Each compression relief 145 includes a pair of lock-retaining tabs 155, the purpose of which is explained below in connection with FIGS. 2A through 2C. Clip 130 is sufficiently rigid so sensors 100 snap into place, in the manner depicted in FIG. 1C, to form a multi-sensor system 160 that includes three sensors 100 arranged substantially in parallel. In one embodiment, clip 130 is Delrin™ plastic, but other materials are also suitable.

FIG. 2A depicts a lock 200 for insertion into respective compression reliefs 145 of a pair of clips 130 (FIGS. 1B and 1C). When installed, lock 200 reduces the flexibility of flexible retaining elements 135, and consequently secures sensors 100 within retaining bays 140. Lock 200 includes a pair of slots 210 and holes 215. Slots 210 mate with respective compression reliefs 145: holes 215 engage lock retaining tabs 155 to secure lock 200 within compression reliefs 145. Lock 200 includes tapered ends that ease insertion and extraction of sensor system 220 into wells, tanks, and the like.

Figure 2B:
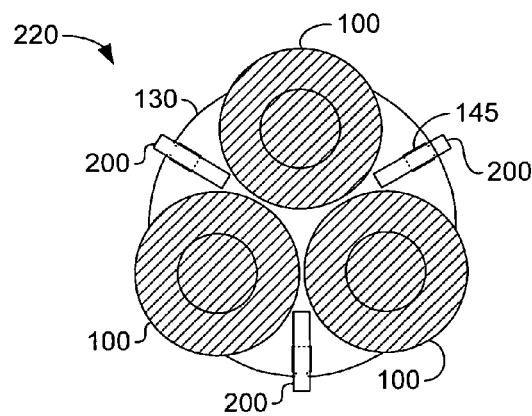
FIG. 2B depicts a multi-sensor system 220 similar to system 160 of FIG. 1C but with three locks 200 inserted into compression reliefs 145 to secure sensors 100 within respective retaining bays 140.
Figure 2C:
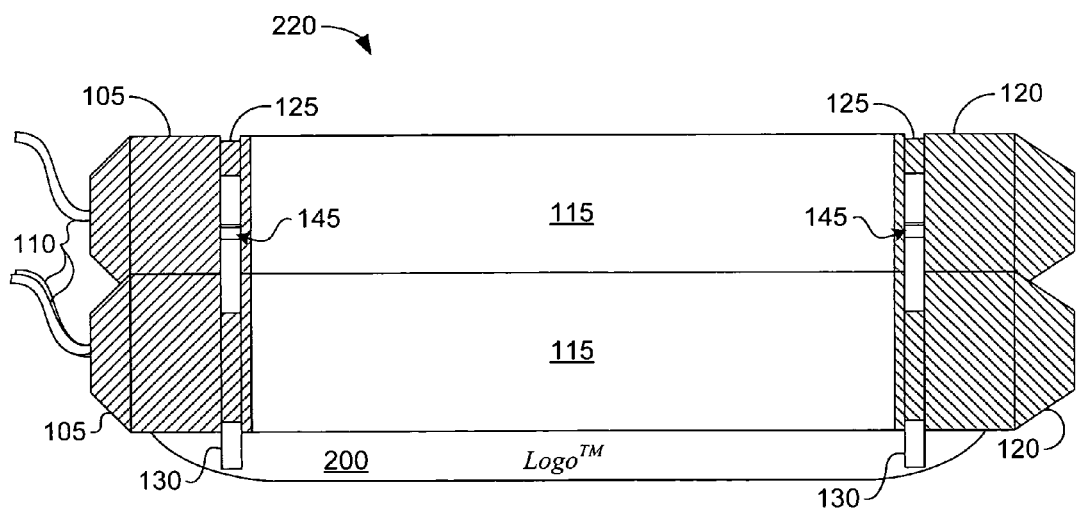
FIG. 2C depicts a side view of system 220 of FIG. 2B.

FIG. 2B depicts a multi-sensor system 220 similar to system 160 of FIG. 1C but with three locks 200 inserted into compression reliefs 145 to secure sensors 100 within respective retaining bays 140. FIG. 2C depicts a side view of system 220 of FIG. 2B with one of locks 200 omitted to better depict a pair of reliefs 145.

Figure 3:
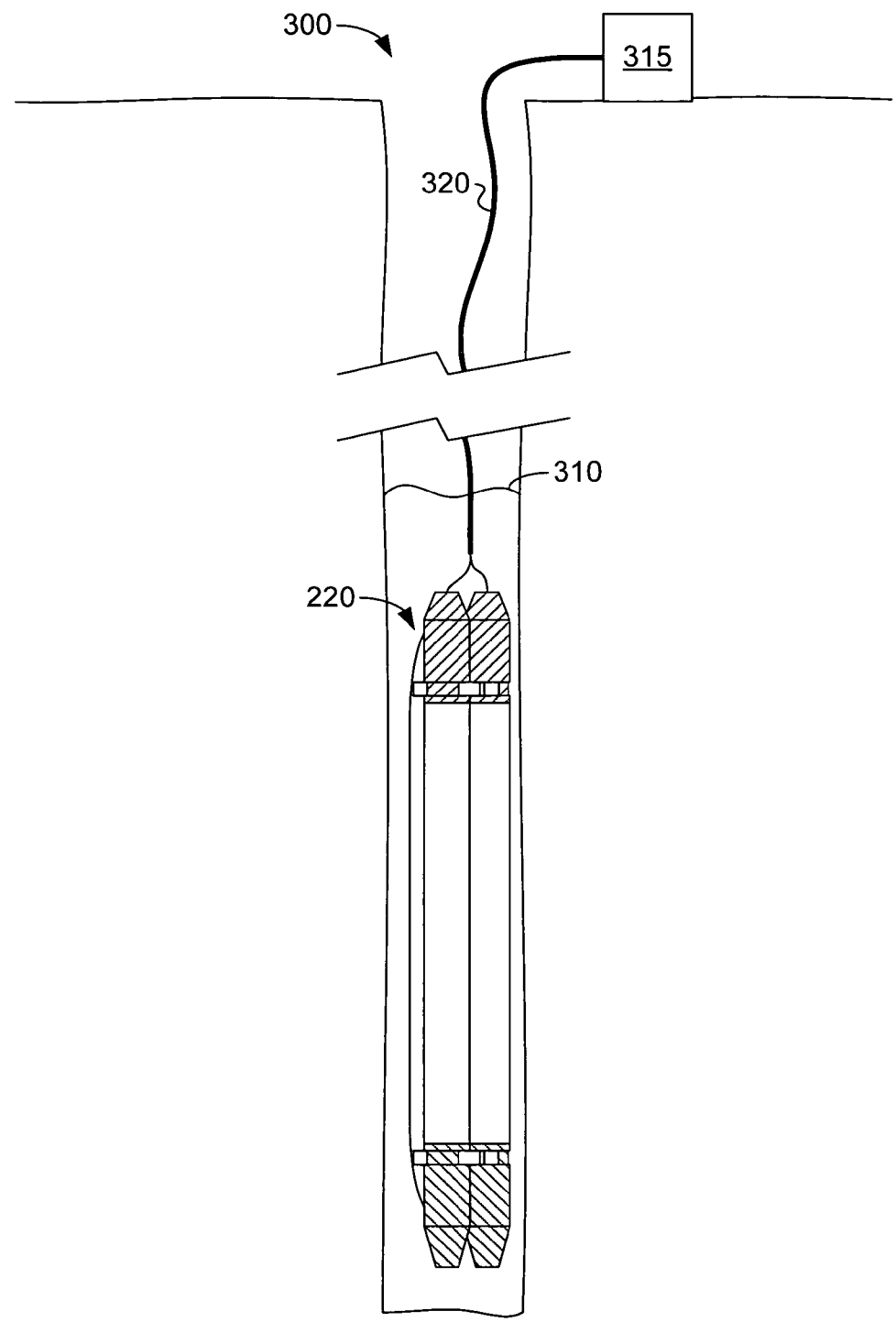
FIG. 3 depicts sensor system 220 of FIG. 2C inserted into a well 300.

FIG. 3 depicts sensor system 220 of FIG. 2C inserted into a well 300. Well 300 includes a water level 310 that is too low to accept a plurality of sensors arranged in series along the depth of well 300. Multi-sensor system 220 connects to an aboveground receiver 315 via a sturdy cable 320.

Figure 4:
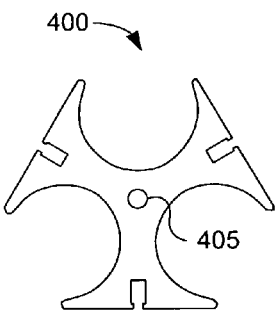
FIG. 4 depicts another embodiment of a clip 400 adapted to support three sensors.

FIGS. 4–10 depict various alternative clip embodiments for securing multiple sensors. FIG. 4 depicts an embodiment of a clip 400 adapted to support three sensors. Clip 400 includes a hole 405 that allows water to drain out of the cavity defined between three sensors. Hole 405 may be advantageous in embodiments in which the sensors tightly contact one another to minimize the collective diameter, and thus create a more or less sealed compartment between them. Hole 405 may also be used to mount a collection of sensors to a rod or cord, or to provide an avenue for a cable.

Figure 5:
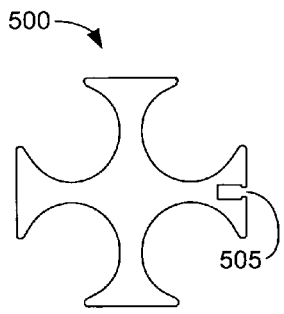
FIG. 5 depicts a clip 500 adapted to support four sensors.

FIG. 5 depicts a clip 500 adapted to support four sensors. Of interest, clip 500 includes only a single compression space 505 that maybe provided with a lock (not shown) of the type discussed above. Provided clip 500 is sufficiently resilient, clip 500 can be assembled into a multi-sensor system by snapping sensors into three retaining bays 510, leaving one retaining bay adjacent compression relief 505 for the last sensor. Compression relief 505 can be locked after inclusion of the last sensor.

Figure 6:
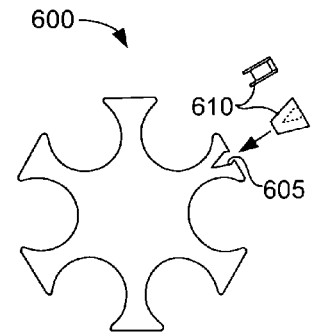
FIG. 6 depicts a clip 600 that supports six sensors.

FIG. 6 depicts a clip 600 that supports six sensors. Clip 600 includes a compression relief 605 that differs in shape from the compression reliefs depicted above to show that the compression relief used in a given embodiment can be adapted as desired. In this example, a lock 610 snaps into relief 605. Lock 610 is also depicted in side-view (uppermost depiction).

Figure 7A:
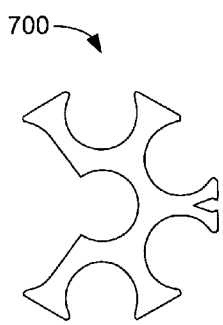
FIGS. 7A and 7B depict a clip 700 that can be used in conjunction with another identical clip to support seven sensors.
Figure 7B:
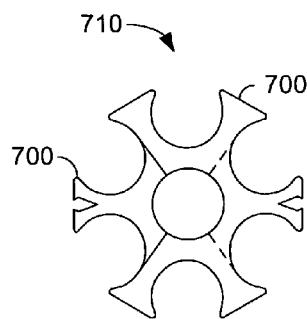

FIG. 7A depicts a clip 700 that can be used in conjunction with another identical clip to support seven sensors without increasing the collective multi-sensor-system diameter beyond that provided by clip 600 of FIG. 6. Two clips 700 can be combined as depicted in FIG. 7B to form a seven-sensor clip 710. The pair of clips 700 share one groove 125. The portions of clips 700 that do not overlap when forming clip 710 can be made twice as thick as the overlapping portions, if desired.

Figure 8:
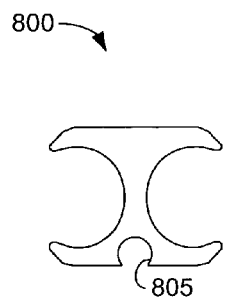
FIG. 8 depicts a two-sensor clip 800 in which the compression relief 805 is semi-circular.

FIG. 8 depicts a two-sensor clip 800 in which the compression relief 805 is semi-circular.

Figure 9:
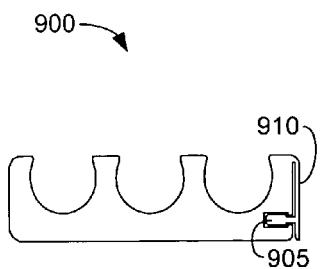
FIG. 9 depicts a clip 900 that can be used to place three sensors in a planar array.

In some cases arrays of sensors are not inserted into a well, but might instead be placed e.g. on the bottom of a lake, pond, or stream. Planar sensor arrays may therefore be preferred in some embodiments. FIG. 9 depicts a clip 900 that can be used to place three sensors in a planar array. A locking mechanism 905 is attached to clip 900 via a flexible member 910 to keep the locking mechanism and clip together when clip 900 is unlocked. Sensors 100 should be loaded left-to-right, leaving the sensor bay adjacent the compression relief for last.

Figure 10:
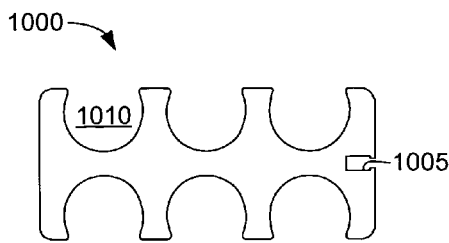
FIG. 10 depicts a clip 1000 adapted to host an array of six sensors arranged in two parallel planes.

FIG. 10 depicts a clip 1000 adapted to host an array of six sensors arranged in two parallel planes. Clip 1000 includes a single compression relief 1005. Clip 1000 should be loaded left-to-right, leaving one of the retaining bays adjacent compression relief 1005 for last.

Figure 11:
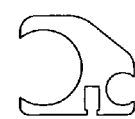
FIG. 11 depicts a clip 1100 that include differently sized retaining bays.

FIG. 11 depicts a clip 1100 that includes differently sized retaining bays. Such embodiments may be desired for use with different types of sensors or to attach one or more sensors to e.g. a support. For example, a collection of sensors may be attached to a support rod adapted to position the sensors at an appropriate position within an effluent well. Though not shown, the retaining bays may also be of shapes other than semicircles and may be adapted to secure elongated elements having non-circular cross-sections.

While the present invention has been described in connection with specific embodiments, variations of these embodiments will be obvious to those of ordinary skill in the art. For example, the clips described above can be used secure elements other than sensors, such as cables, poles, pipes, and electrical conduits. Therefore, the spirit and scope of the appended claims should not be limited to the foregoing description.

What is claimed is:

1. A monitoring system adapted for insertion into a liquid, the monitoring system comprising:
   a. an array of sensors arranged in parallel, each sensor having a respective cable extending up out of the liquid; and
   b. a clip having first and second retaining bays, each retaining bay adapted to receive one of the sensors.

2. The system of claim 1, wherein the retaining bays are defined between ones of a plurality of flexible retaining elements, and wherein at least one of the flexible retaining elements includes a compression relief adapted to ease compression of the at least one retaining element, and thereby to ease admittance of at least one of the sensors.

3. The system of claim 2, further comprising a lock adapted to fit within the compression relief to reduce the ease of compression, and thereby to secure the at least one of the sensors in the respective one of the retaining bays.

4. The system of claim 1, wherein the liquid is water.

5. The system of claim 1, wherein the water is groundwater.

* * * * *